(12) United States Patent
Chi et al.

(10) Patent No.: US 8,356,471 B2
(45) Date of Patent: Jan. 22, 2013

(54) APPARATUS, SYSTEM, AND METHOD FOR CONTROLLING REDUCTANT DOSING IN AN SCR CATALYST SYSTEM

(75) Inventors: John N. Chi, Raleigh, NC (US); Weiwen Wang, Columbus, IN (US); Phanindra Garimella, Columbus, IN (US); Joe V. Hill, Middlesbrough (GB)

(73) Assignee: Cummins IP, Inc., Minneapolis, MN (US)

( * ) Notice: Subject to any disclaimer, the term of this patent is extended or adjusted under 35 U.S.C. 154(b) by 366 days.

(21) Appl. No.: 12/632,628

(22) Filed: Dec. 7, 2009

(65) Prior Publication Data

US 2010/0229531 A1 Sep. 16, 2010

Related U.S. Application Data

(60) Provisional application No. 61/120,304, filed on Dec. 5, 2008.

(51) Int. Cl.
*F01N 3/00* (2006.01)
(52) U.S. Cl. ............... 60/286; 60/274; 60/297; 60/301; 60/303; 703/7; 703/8
(58) Field of Classification Search .............. 60/274, 60/285, 286, 297, 301, 303; 703/7, 8
See application file for complete search history.

(56) References Cited

U.S. PATENT DOCUMENTS

| | | | |
|---|---|---|---|
| 4,314,345 A | 2/1982 | Shiraishi et al. | |
| 5,552,128 A | 9/1996 | Chang et al. | |
| 5,809,775 A | 9/1998 | Tarabulski et al. | |
| 6,109,024 A | 8/2000 | Kinugasa et al. | |
| 6,125,629 A | 10/2000 | Patchett | |
| 6,182,443 B1 | 2/2001 | Jarvis et al. | |
| 6,266,955 B1 | 7/2001 | Liang et al. | |
| 6,269,633 B1 | 8/2001 | van Nieuwstadt et al. | |
| 6,295,809 B1 | 10/2001 | Hammerle et al. | |
| 6,311,484 B1 | 11/2001 | Roth et al. | |
| 6,375,828 B2 | 4/2002 | Ando et al. | |
| 6,415,602 B1 | 7/2002 | Patchett et al. | |
| 6,446,430 B1 | 9/2002 | Roth et al. | |

(Continued)

FOREIGN PATENT DOCUMENTS

| | | |
|---|---|---|
| CN | 1804378 A | 7/2006 |
| CN | 1809685 A | 7/2006 |

(Continued)

OTHER PUBLICATIONS

PCT/US2009/042419 International Search Report and Written Opinion, Jan. 27, 2010.

(Continued)

*Primary Examiner* — Binh Q Tran
(74) *Attorney, Agent, or Firm* — Kunzler Law Group, PC (57) ABSTRACT

According to one representative embodiment, an apparatus for controlling reductant dosing in an SCR catalyst system having a reductant injection system configured to inject reductant into an exhaust gas stream includes a controller, an actual reductant dosing rate module, and a reductant doser compensation module. The controller is configured to determine a reductant dosing rate command representing a desired reductant dosing rate. The actual reductant dosing rate module is configured to determine a predicted actual reductant dosing rate based at least partially on the reductant dosing rate command. The reductant doser compensation module is configured to determine a modified reductant dosing rate command based at least partially on the predicted actual reductant dosing rate. The reductant injection system injects reductant into the exhaust gas stream at a rate corresponding to the modified reductant dosing rate command.

21 Claims, 8 Drawing Sheets

U.S. PATENT DOCUMENTS

| | | |
|---|---|---|
| 6,546,720 B2 | 4/2003 | van Nieuwstadt |
| 6,581,374 B2 | 6/2003 | Patchett et al. |
| 6,662,553 B2 | 12/2003 | Patchett et al. |
| 6,701,707 B1 | 3/2004 | Upadhyay et al. |
| 6,713,030 B1 | 3/2004 | Chandler et al. |
| 6,742,326 B2 * | 6/2004 | Xu et al. ............ 60/284 |
| 6,742,330 B2 | 6/2004 | Genderen |
| 6,829,885 B2 | 12/2004 | Surnilla et al. |
| 6,882,929 B2 | 4/2005 | Liang et al. |
| 6,892,530 B2 | 5/2005 | Montreuil et al. |
| 6,901,745 B2 | 6/2005 | Schnaibel et al. |
| 6,928,806 B2 * | 8/2005 | Tennison et al. ............ 60/286 |
| 6,981,368 B2 | 1/2006 | van Nieuwstadt et al. |
| 6,993,900 B2 | 2/2006 | Upadhyay et al. |
| 7,017,389 B2 | 3/2006 | Gouma |
| 7,063,642 B1 | 6/2006 | Hu et al. |
| 7,093,427 B2 | 8/2006 | van Nieuwstadt et al. |
| 7,113,835 B2 | 9/2006 | Boyden et al. |
| 7,117,046 B2 | 10/2006 | Boyden et al. |
| 7,134,273 B2 | 11/2006 | Mazur et al. |
| 7,150,145 B2 * | 12/2006 | Patchett et al. ............ 60/286 |
| 7,168,243 B2 | 1/2007 | Endicott et al. |
| 7,178,328 B2 | 2/2007 | Solbrig |
| 7,204,081 B2 | 4/2007 | Yasui et al. |
| 7,213,395 B2 | 5/2007 | Hu et al. |
| 7,263,825 B1 | 9/2007 | Wills et al. |
| 7,293,410 B2 | 11/2007 | Miura |
| 7,320,781 B2 | 1/2008 | Lambert et al. |
| 7,332,135 B2 | 2/2008 | Gandhi et al. |
| 7,485,272 B2 | 2/2009 | Driscoll et al. |
| 7,603,846 B2 | 10/2009 | Lueders et al. |
| 7,628,009 B2 | 12/2009 | Hu et al. |
| 7,631,490 B2 | 12/2009 | Colignon |
| 7,650,746 B2 | 1/2010 | Hu et al. |
| 7,685,813 B2 | 3/2010 | McCarthy, Jr. |
| 7,802,419 B2 | 9/2010 | Doring |
| 7,832,200 B2 | 11/2010 | Kesse et al. |
| 7,861,518 B2 | 1/2011 | Federle |
| 7,892,508 B2 | 2/2011 | Katoh |
| 7,950,222 B2 | 5/2011 | Hodzen |
| 7,997,070 B2 | 8/2011 | Yasui et al. |
| 8,020,374 B2 | 9/2011 | Walz et al. |
| 8,061,126 B2 * | 11/2011 | Gady et al. ............ 60/286 |
| 8,074,445 B2 | 12/2011 | Ofoli et al. |
| 2002/0044897 A1 | 4/2002 | Kakwani et al. |
| 2003/0177766 A1 | 9/2003 | Wang |
| 2003/0182935 A1 | 10/2003 | Kawai et al. |
| 2004/0098968 A1 | 5/2004 | van Nieuwstadt et al. |
| 2004/0112046 A1 | 6/2004 | Tumale et al. |
| 2004/0128982 A1 | 7/2004 | Patchett et al. |
| 2005/0260761 A1 | 11/2005 | Lanier et al. |
| 2005/0282285 A1 | 12/2005 | Radhamohan et al. |
| 2006/0086080 A1 | 4/2006 | Katogi et al. |
| 2006/0130458 A1 | 6/2006 | Solbrig |
| 2006/0144038 A1 | 7/2006 | Miura |
| 2006/0155486 A1 | 7/2006 | Walsh et al. |
| 2006/0212140 A1 | 9/2006 | Brackney |
| 2007/0044456 A1 | 3/2007 | Upadhyay et al. |
| 2007/0137181 A1 | 6/2007 | Upadhyay et al. |
| 2007/0137184 A1 | 6/2007 | Patchett et al. |
| 2007/0214777 A1 | 9/2007 | Allansson et al. |
| 2007/0295003 A1 | 12/2007 | Dingle et al. |
| 2008/0022658 A1 | 1/2008 | Viola et al. |
| 2008/0022659 A1 | 1/2008 | Viola et al. |
| 2008/0031793 A1 | 2/2008 | DiFrancesco et al. |
| 2008/0060348 A1 | 3/2008 | Robel et al. |
| 2008/0066455 A1 | 3/2008 | Viola et al. |
| 2008/0250774 A1 | 10/2008 | Solbrig |
| 2008/0250778 A1 | 10/2008 | Solbrig |
| 2008/0295499 A1 | 12/2008 | Driscoll et al. |
| 2009/0272099 A1 | 11/2009 | Garimella et al. |
| 2009/0272101 A1 | 11/2009 | Wills et al. |
| 2009/0272104 A1 | 11/2009 | Garimella et al. |
| 2009/0272105 A1 | 11/2009 | Chi et al. |
| 2009/0301066 A1 * | 12/2009 | Sindano et al. ............ 60/286 |
| 2010/0024390 A1 | 2/2010 | Wills et al. |
| 2010/0024393 A1 | 2/2010 | Chi et al. |
| 2010/0024397 A1 | 2/2010 | Chi et al. |
| 2010/0028230 A1 | 2/2010 | Gady et al. |
| 2010/0043404 A1 | 2/2010 | Hebbale et al. |
| 2010/0122526 A1 | 5/2010 | VanderVeen et al. |
| 2010/0242438 A1 | 9/2010 | Mital |
| 2010/0242440 A1 | 9/2010 | Garimella et al. |
| 2010/0275583 A1 | 11/2010 | Farrell et al. |
| 2011/0058999 A1 | 3/2011 | Ettireddy et al. |
| 2011/0262329 A1 | 10/2011 | Ofoli et al. |

FOREIGN PATENT DOCUMENTS

| | | |
|---|---|---|
| EP | 1129278 B1 | 8/2003 |
| EP | 1338562 A1 | 8/2003 |
| EP | 1083979 B1 | 6/2004 |
| EP | 1431533 | 6/2004 |
| EP | 1339955 B1 | 8/2005 |
| EP | 1609977 A2 | 12/2005 |
| EP | 1672192 A1 | 6/2006 |
| EP | 1712764 A1 | 10/2006 |
| JP | 10118492 A | 5/1998 |
| JP | 2002327617 | 11/2002 |
| JP | 2004100700 | 4/2004 |
| JP | 2007255367 | 10/2007 |
| KR | 1020010043138 | 5/2001 |
| KR | 1020030034139 | 5/2003 |
| KR | 1020080030163 A | 4/2008 |
| KR | 1020100061145 | 11/2008 |
| WO | 9955446 | 11/1999 |
| WO | 0214657 A1 | 2/2002 |
| WO | 2004000443 A1 | 12/2003 |
| WO | 2006000877 A3 | 1/2006 |
| WO | 2007066502 A1 | 6/2007 |
| WO | 2007014649 A1 | 8/2007 |
| WO | WO 2008/009940 A2 * | 1/2008 |

OTHER PUBLICATIONS

PCT/US2009/042412 International Search Report and Written Opinion, Dec. 16, 2009.
PCT/US2009/042321 International Search Report and Written Opinion, Dec. 14, 2009.
PCT/US2009/042335 International Search Report and Written Opinion, Dec. 14, 2009.
PCT/US2009/042330 International Search Report and Written Opinion, Dec. 17, 2009.
PCT/US2009/042340 International Search Report and Written Opinion, Dec. 16, 2009.
U.S. Appl. No. 12/433,600 Notice of Allowance received Nov. 14, 2011.
U.S. Appl. No. 12/112,500 Office Action received Apr. 15, 2011.
U.S. Appl. No. 12/112,500 Notice of Allowance received Sep. 29, 2011.
U.S. Appl. No. 12/112,622 Office Action received Mar. 3, 2011.
U.S. Appl. No. 12/112,622 Notice of Allowance received Aug. 5, 2011.
U.S. Appl. No. 12/112,678 Office Action received Feb. 7, 2011.
U.S. Appl. No. 12/112,678 Final Office Action received Jul. 22, 2011.
U.S. Appl. No. 12/112,678 Office Action received Sep. 30, 2011.
U.S. Appl. No. 12/112,795 Office Action received Sep. 20, 2011.
U.S. Appl. No. 12/433,705 Office Action received Nov. 8, 2011.
U.S. Appl. No. 12/433,767 Office Action received Oct. 26, 2011.
U.S. Appl. No. 12/433,730 Office Action received Oct. 7, 2011.
PCT/US2009/042406 International Search Report and Written Opinion, Dec. 18, 2009.
U.S. Appl. No. 12/433,586 Office Action received Oct. 24, 2011.
U.S. Appl. No. 12/112,678 Notice of Allowance received Feb. 2, 2012.
PCT/US2009/042409, International Search Report and Written Opinion, Nov. 25, 2009.
PCT/US2009/042423, International Search Report and Written Opinion, Nov. 27, 2009.
P.R. Ettireddy et al. "Surface characterization studies of $TiO_2$ supported manganese oxide catalysts for low temperature SCR of NO with $NH_3$" Applied Catalysis B, 76 (2007).
D.A. Pena, et al. "Identification of Surface Species on Titania-Supported Manganese, Chromium, and Copper Oxide Low-Temperature SRC Catalysts": Journal of Physical Chemistry B, 108 (2004) 9927-9936.

PCT/US2010/048502, International Search Report and Written Opinion, May 23, 2011.
PCT/US2009/067023, International Search Report and Written Opinion, Jul. 13, 2010.
PCT/US2009/067020, International Search Report and Written Opinion, Jul. 13, 2010.
Control of a Urea SCR Catalytic Converter System for a Mobile Heavy Duty Diesel Engine—C.M. Schar, C.H. Onder, H.P. Geering and M. Elsener—SAE 2003-01-0776, Mar. 6, 2003.
U.S. Appl. No. 12/632,646 Notice of Allowance mailed Jun. 4, 2012.
U.S. Appl. No. 12/433,586 Notice of Allowance mailed Jul. 12, 2012.
U.S. Appl. No. 12/433,730 Office Action mailed May 10, 2012.
U.S. Appl. No. 12/433,767 Notice of Allowance mailed Aug. 3, 2012.
U.S. Appl. No. 12/767,664 Office Action mailed Aug. 3, 2012.
U.S. Appl. No. 12/433,586 Office Action received Mar. 20, 2012.
PCT/US2011/033767 International Search Report and Written Opinion, Feb. 8, 2012.
U.S. Appl. No. 12/112,795 Notice of Allowance received Mar. 2, 2012.
U.S. Appl. No. 12/433,705 Notice of Allowance received Apr. 2, 2012.
U.S. Appl. No. 12/433,767 Office Action received Apr. 6, 2012.
U.S. Appl. No. 12/433,730 Final Office Action mailed Oct. 9, 2012.
Chinese Patent Application No. 200980115540.1 Office Action mailed Jun. 26, 2012.

* cited by examiner

APPARATUS, SYSTEM, AND METHOD FOR CONTROLLING REDUCTANT DOSING IN AN SCR CATALYST SYSTEM

CROSS-REFERENCE TO RELATED APPLICATION

This application claims the benefit of U.S. Provisional Patent Application No. 61/120,304, filed Dec. 5, 2008, which is incorporated herein by reference.

FIELD

This disclosure relates to controlling nitrogen oxides ($NO_x$) emissions for internal combustion engines, and more particularly to an apparatus, system and method for controlling reductant dosing in a selective catalytic reduction (SCR) catalyst.

BACKGROUND

Emissions regulations for internal combustion engines have become more stringent over recent years. The regulated emissions of $NO_x$ and particulates from internal combustion engines are low enough that in many cases the emissions levels cannot be met with improved combustion technologies. Therefore, the use of aftertreatment systems on engines to reduce emissions is increasing. For reducing $NO_x$ emissions, $NO_x$ reduction catalysts, including selective catalytic reduction (SCR) systems, are utilized to convert $NO_x$ ($NO_x$ and $NO_2$ in some fraction) to $N_2$ and other compounds. SCR systems utilize a reductant, typically ammonia, to reduce the $NO_x$. The reductant is injected into a combustion engine's exhaust stream upstream of an SCR catalyst. In the presence of the SCR catalyst, the ammonia reacts with the $NO_x$ in the exhaust stream to reduce the $NO_x$ to less harmful emissions. Currently available SCR systems can produce high $NO_x$ conversion rates allowing the combustion technologies to focus on power and efficiency. However, currently available SCR systems also suffer from a few drawbacks.

For example, conventional reductant delivery systems can experience inherent delays and inaccuracies between a commanded dosing rate and the actual dosing rate due to the valve opening and closing characteristics associated with conventional pulsed urea dosage devices. Typical pulsed urea dosage devices pulse at high frequencies for high urea dosing rates and low frequencies for low urea dosing rates. When pulsing at high frequencies, the dosing valve is closed for short durations, but at low frequencies, the dosing valve is closed for long durations. Because the dosing valve is pulsed differently for different dosing rates, the actual dosing rate may be different than the commanded dosing rate.

Additionally, with many conventional SCR systems, the reductant dosing rate depends upon the real-time delivery of reductant into the exhaust stream. But, reductant dosers typically have relatively slow physical dynamics compared to other chemical injectors such as hydrocarbon injectors. Therefore, reliance on real-time reductant delivery may result in inaccuracies between the commanded reductant dosing rate and the actual reductant dosing rate during transient operating conditions due to the physical delays of the reductant dosing system. Generally, reductant dosing delays during transient operating conditions are greater at lower dosing rates and lesser at higher dosing rates. Accordingly, for smaller combustion engines that need smaller amounts of reductant dosing, the dosing system may experience undesirable delays during transient operating conditions. Such delays can cause the reductant delivery system to be out of phase with the $NO_x$ emissions rate, which can lead to undesirable $NO_x$ spikes at the tailpipe outlet.

Based on the above, a need exists for an SCR system that accounts for potential inaccuracies between commanded and actual reductant flow rates, as well as inherent delays associated with reductant delivery system dynamics, to reduce NOx emission spikes and improve the overall $NO_x$ conversion efficiency of the system.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, systems, and methods for reducing $NO_x$ emissions on an SCR catalyst that overcomes at least some shortcomings of the prior art aftertreatment systems.

For example, according to one representative embodiment, an apparatus for controlling reductant dosing in an SCR catalyst system having a reductant injection system configured to inject reductant into an exhaust gas stream includes a controller, an actual reductant dosing rate module, and a reductant doser compensation module. The controller is configured to determine a reductant dosing rate command representing a desired reductant dosing rate. The actual reductant dosing rate module is configured to determine a predicted actual reductant dosing rate based at least partially on the reductant dosing rate command. The reductant doser compensation module is configured to determine a modified reductant dosing rate command based at least partially on the predicted actual reductant dosing rate. The reductant injection system injects reductant into the exhaust gas stream at a rate corresponding to the modified reductant dosing rate command.

According to some implementations, the actual reductant dosing rate module comprises a natural delay module configured to determine a natural delay compensated reductant dosing rate. The natural delay compensated reductant dosing rate can be determined by multiplying the desired reductant dosing rate by Equation 1 below. The actual reductant dosing rate module can also include a reductant doser plant module configured to determine the predicted actual reductant dosing rate based at least partially on the natural delay compensated reductant dosing rate. In some instances, the predicted actual reductant dosing rate is determined by multiplying the natural delay compensated reductant dosing rate by Equation 2 below. In certain implementations, the apparatus includes at least one look-up table that is accessible by the reductant doser plant module. The at least one look-up table can include experimentally obtained data sets from which the steady state gain offset parameter $\delta$, the first time constant parameter $\alpha$, and the second time constant parameter $\beta$ of Equation 2 are obtained.

According to some implementations, the reductant dower compensation module includes an inverted reductant doser plant module configured to determine the modified reductant dosing rate command by multiplying the predicted actual reductant dosing rate by Equation 3 below. In certain implementations, the apparatus includes at least one look-up table that is accessible by the inverted reductant doser plant module. The at least one look-up table can include experimentally obtained data sets from which the steady state gain offset parameter $\delta$, the first time constant parameter $\alpha$, and the second time constant parameter $\beta$ of Equation 3 are obtained.

In certain implementations, the modified reductant dosing rate command compensates for (i) discrepancies between the reductant dosing rate command and the actual reductant dosing rate of the reductant injected into the exhaust gas stream; and (ii) any physical delays of the reductant injection system.

According to another representative embodiment, a method for controlling reductant dosing in an SCR catalyst system having a reductant injector configured to inject reductant into an exhaust gas stream includes several operative actions. For example, the method can include determining a reductant dosing rate command representing a desired reductant dosing rate. The method can also include determining a predicted actual reductant dosing rate corresponding to the reductant dosing rate command and determining a modified reductant dosing rate command based at least partially on the predicted actual reductant dosing rate. Additionally, the method includes injecting reductant into the exhaust gas stream at a rate corresponding to the modified reductant dosing rate command.

In some implementations, the method includes modifying the reductant dosing rate command to compensate for a natural delay of the SCR catalyst system. Moreover, the predicted actual reductant dosing rate can be based at least partially on the natural delay of the SCR catalyst system.

In certain instances, the modified reductant dosing rate command is based at least partially on the difference between a predetermined actual reductant dosing rate resulting from the reductant dosing rate command and the desired reductant dosing rate. In yet certain instances, the modified reductant dosing rate command is based at least partially on a predetermined time constant between the reductant dosing rate command and an injection of reductant corresponding to the reductant dosing rate command. Additionally, in some instances, the modified reductant dosing rate command is based at least partially on a first predetermined time constant and second predetermined time constant, wherein the first predetermined time constant comprises a micro-controller pure delay and the second predetermined time constant comprises an actuation system dynamics delay. In some implementations, the modified reductant dosing rate command is a function of Equation 3 below, where $\delta$ is a predetermined steady state gain offset between the reductant dosing rate command and an actual injection rate of reductant corresponding to the reductant dosing rate command, $\alpha$ is a first predetermined time constant based at least partially on the time delay between the reductant dosing rate command and the actual injection of reductant corresponding to the reductant dosing rate command, and $\beta$ is a second predetermined time constant based at least partially on the time delay between the reductant dosing rate command and the actual injection of reductant corresponding to the reductant dosing rate command. In some instances, $\alpha$ is a first predetermined time constant corresponding to the high corner frequency of the actuation system frequency response characteristic at the commanded dosing rate, and $\beta$ is a second predetermined time constant corresponding to the low corner frequency of the actuation system frequency response characteristic at the commanded dosing rate.

In another representative embodiment, a system for controlling reductant dosing in an SCR catalyst system of an engine system includes an internal combustion engine, an SCR catalyst, a reductant injector and a controller. The controller includes a reductant dosing rate command module configured to determine a reductant dosing rate command corresponding to a desired reductant dosing rate. Additionally, the controller includes an actual reductant dosing rate module configured to determine a predicted actual reductant dosing rate corresponding to the reductant dosing rate command. The predicted actual reductant dosing rate is a function of the natural delay of the reductant injection system. The controller also includes a reductant doser compensation module configured to determine a modified reductant dosing rate command representing a modified reductant dosing rate. The modified reductant dosing rate is a function of an accuracy and a time delay of the injection system. In some instances, the accuracy includes the difference between a predetermined actual reductant dosing rate resulting from the reductant dosing rate command and the desired reductant dosing rate. In yet some instances, the time delay includes a predetermined time constant between the reductant dosing rate command to inject reductant into the exhaust gas stream at the desired dosing rate and the actual injection of the reductant. The reductant injection system is configured to inject reductant into the exhaust gas stream at the modified reductant dosing rate according to the modified reductant dosing rate command such that the actual reductant dosing rate is substantially equal to desired reductant dosing rate.

According to some implementations, the actual reductant dosing rate module determines the predicted actual dosing rate by multiplying the desired reductant dosing rate by Equation 1 below and Equation 2 below. In some implementations, the reductant doser compensation module determines the modified reductant dosing rate associated with the modified reductant dosing rate command by multiplying the predicted actual dosing rate by Equation 3 below. wherein the first time constant parameter $\alpha$ comprises the inverse of a higher corner frequency of a normalized reductant dosing frequency response characteristic at the commanded reductant dosing rate, and the second time constant parameter $\beta$ comprises the inverse of a lower corner frequency of the normalized reductant dosing frequency response characteristic at the commanded reductant dosing rate.

In certain instances of the system, the higher the desired reductant dosing rate, the greater the impact of the accuracy of the injection system on the modified reductant dosing rate command and the lesser the impact of the time delay of the injection system on the modified reductant dosing rate command. Similarly, the lower the desired reductant dosing rate, the lesser the impact of accuracy of the injection system on the modified reductant dosing rate command and the greater the impact of the time delay of the injection system on the modified reductant dosing rate command.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Furthermore, the described features, advantages, and characteristics of the subject matter of the present disclosure may be combined in any suitable manner in one or more embodiments. One skilled in the relevant art will recognize that the subject matter may be practiced without one or more of the specific features or advantages of a particular embodiment. In other instances, additional features and advantages may be recognized in certain embodiments that may not be present in all embodiments. These features and advantages will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the subject matter described herein may be combined in any suitable manner in one or more embodiments. In the following description, numerous specific details are provided, such as examples of controls, structures, algorithms, programming, software modules, user selections, network transactions, database queries, database structures, hardware modules, hardware circuits, hardware chips, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

Figure 1:
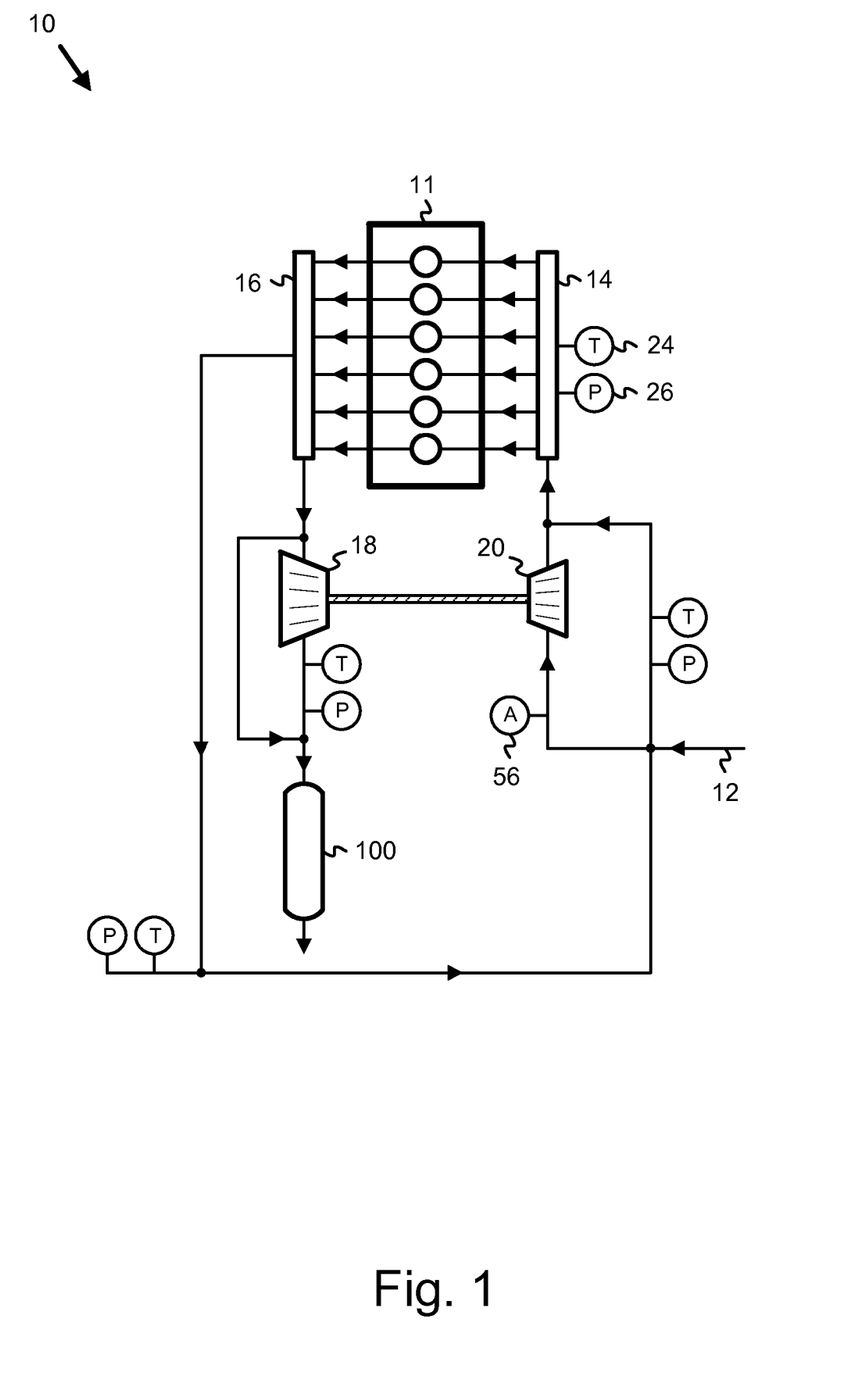
FIG. 1 is a schematic diagram of an internal combustion engine system having an exhaust after-treatment system according to one representative embodiment.

FIG. 1 depicts one embodiment of an internal combustion engine system 10. The main components of the engine system 10 include an internal combustion engine 11 and an exhaust gas after-treatment system 100 coupled to the engine. The internal combustion engine 11 can be a compression ignited internal combustion engine, such as a diesel fueled engine, or a spark-ignited internal combustion engine, such as a gasoline fueled engine operated lean. The engine system 10 further includes an air inlet 12, intake manifold 14, exhaust manifold 16, turbocharger turbine 18, turbocharger compressor 20, temperature sensors (e.g., temperature sensor 24), pressure sensors (e.g., pressure sensor 26), and air-flow sensor 56. The air inlet 12 is vented to the atmosphere and connected to an inlet of the intake manifold 14 to enable air to enter the intake manifold. The intake manifold 14 includes an outlet operatively coupled to compression chambers of the internal combustion engine 11 for introducing air into the compression chambers.

Within the internal combustion engine 11, the air from the atmosphere is combined with fuel to power the engine. Combustion of the fuel and air produces exhaust gas that is operatively vented to the exhaust manifold 16. From the exhaust manifold 16, a portion of the exhaust gas may be used to power the turbocharger turbine 18. The turbine 18 drives the turbocharger compressor 20, which may compress at least some of the air entering the air inlet 12 before directing it to the intake manifold 14 and into the compression chambers of the engine 11.

The exhaust gas after-treatment system 100 is coupled to the exhaust manifold 16 of the engine 11. At least a portion of the exhaust gas exiting the exhaust manifold 16 can pass through the exhaust after-treatment system 100. In certain implementations, the engine system 10 includes an exhaust gas recirculation (EGR) valve (not shown) configured to open to allow a portion of the exhaust gas to recirculate back into the compression chambers for altering the combustion properties of the engine 11.

Figure 2:
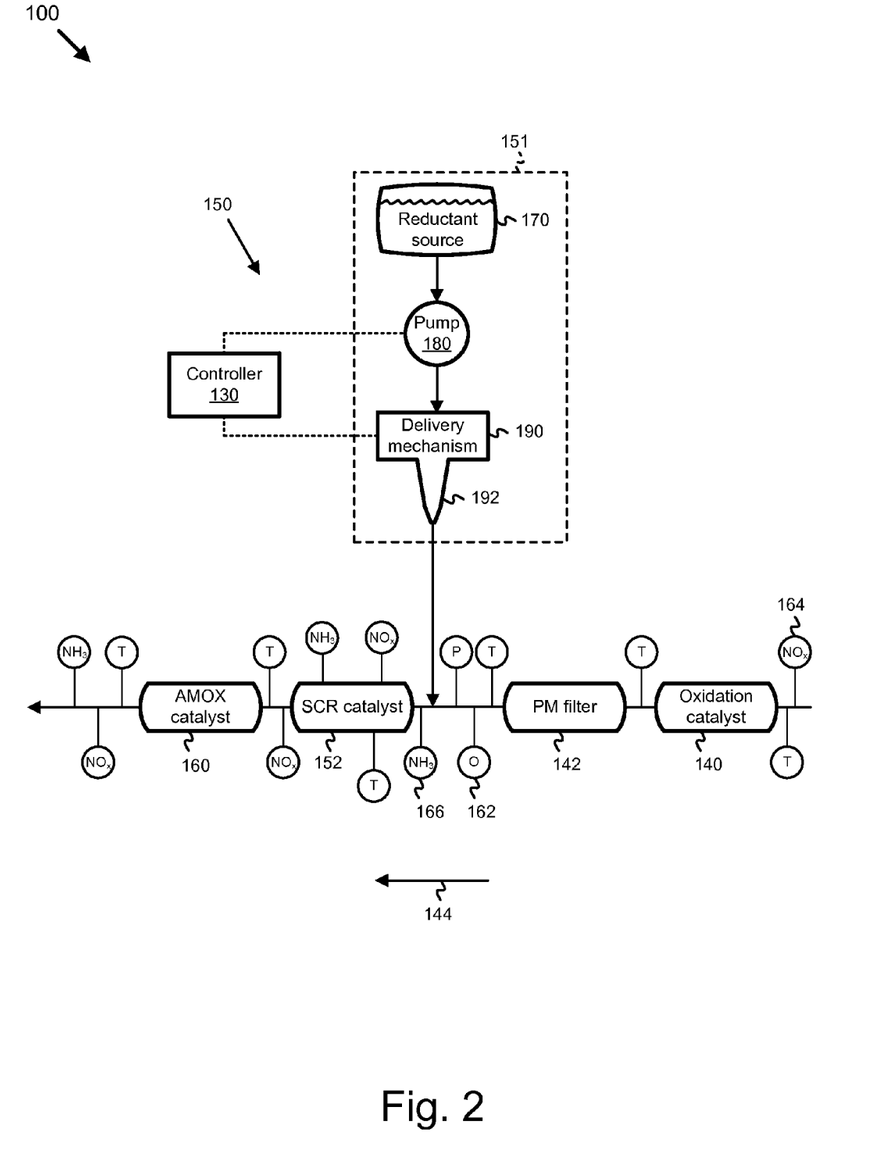
FIG. 2 is a more detailed schematic diagram of the exhaust after-treatment system of FIG. 1 according to one representative embodiment.

Generally, the exhaust gas after-treatment system 100 is configured to remove various chemical compound and particulate emissions present in the exhaust gas received from the exhaust manifold 16 and not recirculated back into the engine 11. As illustrated in FIG. 2, the exhaust gas after-treatment system 100 includes controller 130, oxidation catalyst 140, particulate matter (PM) filter 142, SCR system 150 having an SCR catalyst 152, and ammonia oxidation (AMOX) catalyst 160. In an exhaust flow direction, indicated by directional arrow 144, exhaust may flow from the exhaust manifold 16, through the oxidation catalyst 140, through the particulate filter 142, through the SCR catalyst 152, through the AMOX catalyst 160, and then be expelled into the atmosphere. In other words, the particulate filter 142 is positioned downstream of the oxidation catalyst 140, the SCR catalyst 152 is positioned downstream of the particulate filter 142, and the AMOX catalyst 160 is positioned downstream of the SCR catalyst 152. Generally, exhaust gas treated in the exhaust gas after-treatment system 100 and released into the atmosphere consequently contains significantly fewer pollutants, such as diesel particulate matter, $NO_x$, hydrocarbons, such as carbon monoxide and carbon dioxide, than untreated exhaust gas.

The oxidation catalyst 140 can be any of various flow-through, diesel oxidation catalysts (DOC) known in the art. Generally, the oxidation catalyst 140 is configured to oxidize at least some particulate matter, e.g., the soluble organic fraction of soot, in the exhaust and reduce unburned hydrocarbons and CO in the exhaust to less environmentally harmful compounds. For example, the oxidation catalyst 140 may sufficiently reduce the hydrocarbon and CO concentrations in the exhaust to meet the requisite emissions standards.

The particulate filter 142 can be any of various particulate filters known in the art configured to reduce particulate matter concentrations, e.g., soot and ash, in the exhaust gas to meet requisite emission standards. The particulate filter 142 can be electrically coupled to a controller, such as controller 130, that controls various characteristics of the particulate filter, such as, for example, the timing and duration of filter regeneration events. In some implementations, the particulate filter 142 and associated control system are similar to, or the same as, the respective particulate filters and control systems described in U.S. patent application Ser. Nos. 11/227,320 (filed Sep. 15, 2005); 11/227,403 (filed Sep. 15, 2005); 11/227,857 (filed Sep. 15, 2005); and 11/301,998 (filed Dec. 13, 2005), which are incorporated herein by reference.

The SCR system 150 can be similar to the SCR systems described in U.S. patent application Ser. Nos. 12/112,500; 12/112,622; 12/112,678; and 12/112,795, each filed Apr. 30, 2008, U.S. Provisional Application Nos. 61/120,283; 61/120, 297; and 61/120,319, each filed Dec. 5, 2008 (hereinafter "incorporated U.S. patent applications"), which are each incorporated herein by reference. For example, the SCR system 150 includes a reductant delivery system 151 that includes a reductant source 170, pump 180 and delivery mechanism 190. The reductant source 170 can be a container or tank capable of retaining a reductant, such as, for example, ammonia ($NH_3$), urea, diesel fuel, or diesel oil. The reductant source 170 is in reductant supplying communication with the pump 180, which is configured to pump reductant from the reductant source to the delivery mechanism 190. The delivery mechanism 190 can include a reductant injector schematically shown at 192 positioned upstream of the SCR catalyst 152. The injector is selectively controllable to inject reductant directly into the exhaust gas stream prior to entering the SCR catalyst 152. In some embodiments, the reductant can either be ammonia or urea, which decomposes to produce ammonia. The ammonia reacts with $NO_x$ in the presence of the SCR catalyst 152 to reduce the $NO_x$ to less harmful emissions, such as $N_2$ and $H_2O$. The SCR catalyst 152 can be any of various catalysts known in the art. For example, in some implementations, the SCR catalyst 152 is a vanadium-based catalyst, and in other implementations, the SCR catalyst is a zeolite-based catalyst, such as a Cu-Zeolite or a Fe-Zeolite catalyst. In one representative embodiment, the reductant is aqueous urea and the SCR catalyst 152 is a zeolite-based catalyst.

The AMOX catalyst 160 can be any of various flow-through catalysts configured to react with ammonia to produce mainly nitrogen. Generally, the AMOX catalyst 160 is utilized to remove ammonia that has slipped through or exited the SCR catalyst 152 without reacting with $NO_x$ in the exhaust. In certain instances, the system 10 can be operable with or without an AMOX catalyst. Further, although the AMOX catalyst 160 is shown as a separate unit from the SCR catalyst 152, in some implementations, the AMOX catalyst can be integrated with the SCR catalyst, e.g., the AMOX catalyst and the SCR catalyst can be located within the same housing.

As shown in FIG. 2, the exhaust after-treatment system 100 includes various sensors, such as temperature sensors, pressure sensors, oxygen sensors (e.g., oxygen sensor 162), $NO_x$ sensors (e.g., $NO_x$ sensor 164), $NH_3$ sensors (e.g., $NH_3$ sensor 166), dual ammonia/$NO_x$ sensors (not shown) and the like, that are disposed throughout the exhaust gas after-treatment system. The various sensors may be in electrical communication with the controller 130 to monitor operating conditions and control the engine system 10, including the exhaust after-treatment system 100.

Although the exhaust after-treatment system 100 shown includes one of an oxidation catalyst 140, particulate filter 142, SCR catalyst 152, and AMOX catalyst 160 positioned in specific locations relative to each other along the exhaust flow path, in other embodiments, the exhaust after-treatment system may include more than one of any of the various catalysts positioned in any of various positions relative to each other along the exhaust flow path as desired. Further, although the oxidation catalyst 140 and AMOX catalyst 160 are non-selective catalysts, in some embodiments, the oxidation and AMOX catalysts can be selective catalysts.

The controller 130 controls the operation of the engine system 10 and associated sub-systems, such as the engine 11 and exhaust gas after-treatment system 100. The controller 130 is depicted in FIG. 2 as a single physical unit, but can include two or more physically separated units or components in some embodiments if desired. Generally, the controller 130 receives multiple inputs, processes the inputs, and transmits multiple outputs. The multiple inputs may include sensed measurements from the sensors and various user inputs. The inputs are processed by the controller 130 using various algorithms, stored data, and other inputs to update the stored data and/or generate output values. The generated output values and/or commands are transmitted to other components of the controller and/or to one or more elements of the engine system 10 to control the system to achieve desired results, and more specifically, achieve desired exhaust gas emissions.

The controller 130 includes various modules for controlling the operation of the engine system 10. For example, the controller 130 includes one or more modules (not shown) for controlling the operation of the particulate filter 142 as described above. The controller 130 also includes one or more modules for controlling the operation of the SCR system 150.

The controller 130 further includes one or more modules (not shown) for controlling the operation of the engine 11. Additionally, in the event the oxidation catalyst 140 and AMOX catalyst 160 are selectively controllable, the controller 130 can include one or more modules (not shown) for controlling the operation of the respective oxidation and AMOX catalysts.

In operation, the controller 130 is configured to command the reductant delivery mechanism 190 to inject reductant into the exhaust stream at a specified reductant dosing rate based on a commanded reductant dosing rate. More specifically, in certain embodiments, the controller 130 determines a modified reductant dosing rate command 240 representing a modified reductant dosing rate and communicates the command 240 to the reductant delivery mechanism 190.

Figure 3:
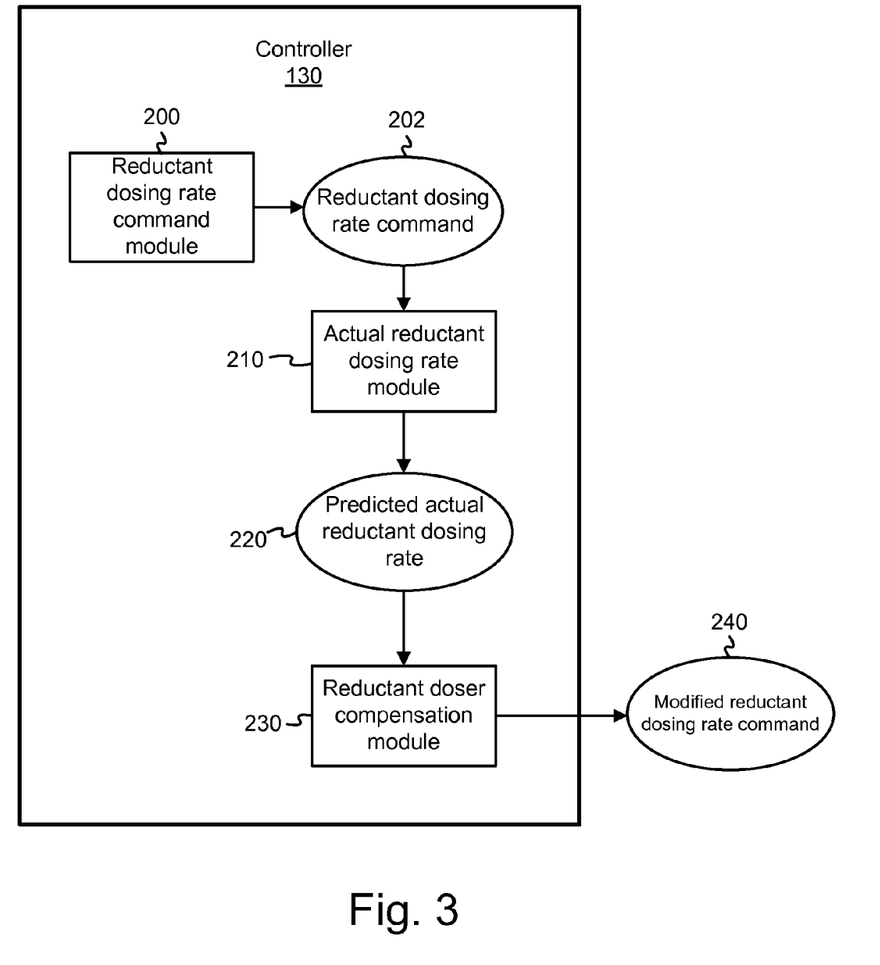
FIG. 3 is a schematic diagram of a controller of the internal combustion engine system according to one representative embodiment.

Referring to FIG. 3, the controller 130 can include a reductant dosing rate command module 200 configured to determine a reductant dosing rate command 202 representing the desired reductant dosing rate. The desired reductant dosing rate can be based on one or more of a plurality of factors and conditions, as is described in the incorporated U.S. patent applications. In most instances, the commanded reductant dosing rate corresponds to the reductant dosing rate that results in the necessary amount of ammonia at the SCR catalyst inlet for achieving an optimal amount of $NO_x$ reduction at an optimal $NO_x$ reduction efficiency under the operating conditions of the engine system 10 for a specific moment in time. Accordingly, to achieve the optimal or desired amount of $NO_x$ reduction and $NO_x$ reduction efficiency, the actual amount of reductant, e.g., actual reductant dosing rate, injected into the exhaust stream should be equal to the commanded reductant dosing rate. Moreover, the actual reductant must be injected into the exhaust stream at an anticipated time associated with the specific moment in time. If the actual reductant rate does not correspond with the commanded reductant dosing rate, or if the actual reductant injection is delayed, the desired $NO_x$ reduction rate and efficiency may not be achieved, and undesirable $NO_x$ emission spikes may occur during transient operating conditions.

The reductant delivery system 150 accounts for possible inaccuracies in the actual reductant dosing rate and physical delays in the actual injection of reductant by compensating for the commanded reductant dosing rate such that the actual reductant dosing rate and actual reductant injection timing corresponds with the commanded reductant dosing rate and commanded injection timing. Referring to FIG. 3, the controller 130 includes an actual urea dosing rate module 210 and a reductant doser compensation module 230 communicable in data receiving communication with the actual urea dosing rate module.

Figure 4:
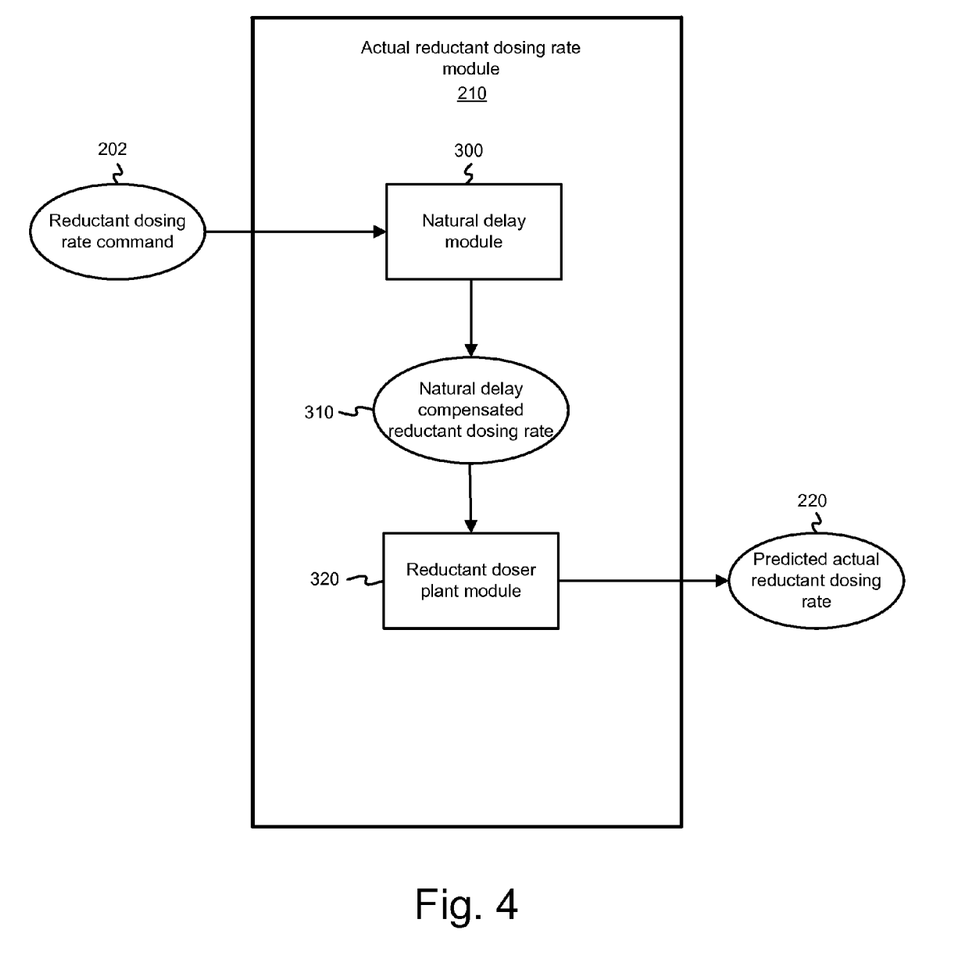
FIG. 4 is a schematic diagram of an actual reductant dosing rate module of the controller of FIG. 3 according to one representative embodiment.

The actual urea dosing rate module 210 receives a commanded reductant dosing rate 202 and determines a predicted actual urea dosing rate 160 that would result from the commanded reductant dosing rate. The commanded reductant dosing rate 202 can be generated by a module of a controller, such as module 200 of controller 130, in any of various ways based on any of various parameters and operating conditions, such as described in the incorporated U.S. patent applications. Referring to FIG. 4, the actual urea dosing rate module 210 includes a natural delay module 300 and a reductant doser plant module 320.

The natural delay module 300 modifies the commanded reductant dosing rate represented by the reductant dosing rate command 202 to obtain a natural delay compensated reductant dosing rate 310. The natural delay compensated reductant dosing rate 310 account for the natural or inherent delay of the engine control system through application of the following equation:

$$e^{-sT_d} \quad (1)$$

where s is a complex variable used for Laplace transforms and $T_d$ is the pure delay of the system. The complex variable s can be expressed as $\sigma+j\omega$, where $\sigma$ represents the amplitude and $\omega$ represents the frequency of a sinusoidal wave associated with a given urea dosing rate input. The pure delay of any control system is the delay associated with, among other things, the finite velocity of electronic signals along transmission paths, and can vary from control system to control system. As is well known in the art, the pure delay of a system, e.g., $T_d$, can be determined through simple experimentation. The natural delay compensated reductant dosing rate 310 is obtained by multiplying the commanded reductant dosing rate 200 by the value obtained through application of Equation 1. Generally, the higher the pure delay of the system, the lower the natural delay compensated reductant dosing rate 310, i.e., the greater the reduction of the commanded reductant dosing rate 200.

The reductant doser plant module 320 receives the natural delay compensated reductant dosing rate 310 from the natural delay module 300 and modifies it to obtain a predicted actual reductant dosing rate 220. The natural delay compensated reductant dosing rate 310 is modified through application of a reductant doser plant model P(s) defined by the following equation:

$$P(s) = \frac{\alpha s + \delta}{\beta s + 1} \quad (2)$$

where s is a is a complex variable used for Laplace transforms as described above, and $\delta$, $\alpha$, and $\beta$ are experimentally obtained parameters. The reductant doser plant module 320 calculates the actual reductant dosing rate 220 by multiplying the natural delay compensated reductant dosing rate 310 by the reductant doser plant model P(s) value.

Figure 6:
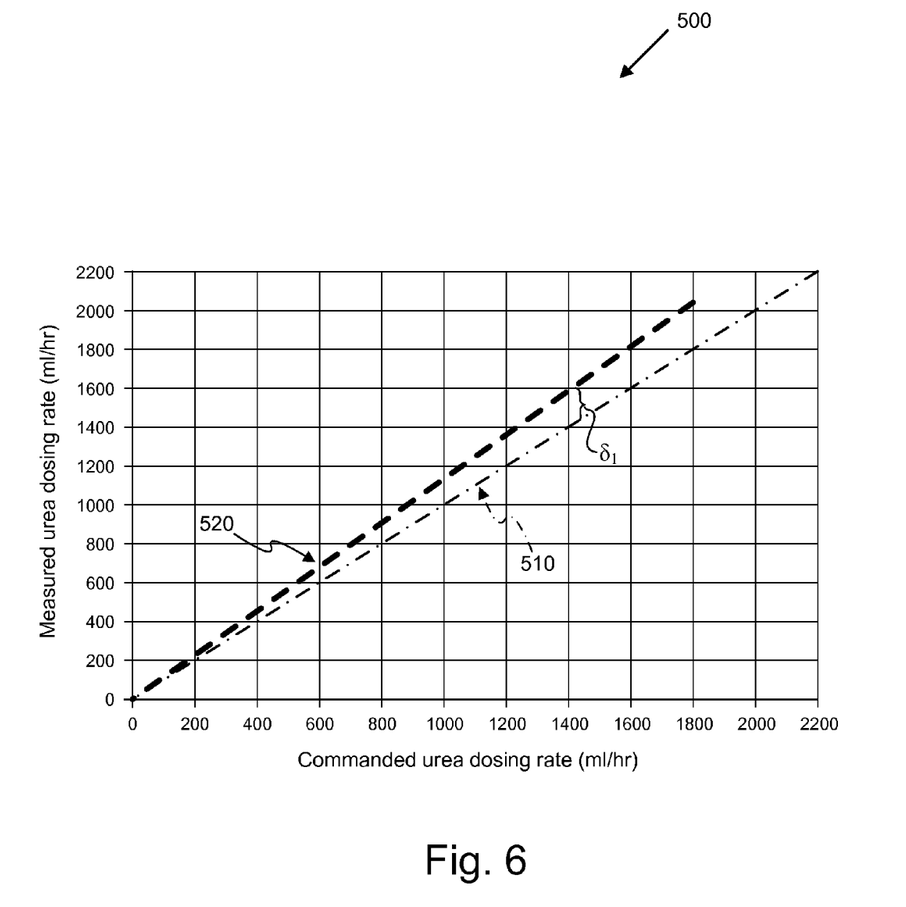
FIG. 6 is a graph illustrating a functional relationship between commanded reductant dosing rate and the corresponding actual reductant dosing rate for a representative reductant doser.

The steady state gain offset parameter $\delta$ can be obtained by comparing the commanded dosing rate versus the actual measured dosing rate. FIG. 6 shows a function relationship 500 of measured reductant dosing rates versus commanded reductant dosing rates based on empirical evidence from a representative doser of a representative engine system. The plotted line 510 represents an ideal one-to-one ratio between commanded reductant dosing rate and actual reductant dosing rate. In other words, the plotted line 510 represents the ideal situation where the actual reductant dosing rate equals the commanded reductant dosing rate. The plotted line 520 represents the actual test data regarding the relationship between the reductant dosing rate measured and the reductant dosing rate commanded obtained during experimental testing. The steady state gain offset parameter $\delta$ for a given commanded reductant dosing rate is the normalized difference between the ideal and actual commanded versus measured reductant dosing rate plot lines at the given commanded reductant dosing rate. For example, according to the representative test data shown in the function relationship 500, the steady state gain offset parameter $\delta_1$ for a commanded reductant dosing rate of 1,400 ml/hr is approximately 200 ml/hr. As shown, the steady state gain offset parameter $\delta$ value increases as the commanded reductant dosing rate increases.

Alternatively, the steady state gain offset parameter $\delta$ can be determined from experimentally obtained frequency response characteristic plots of the reductant delivery system 151. The frequency response characteristic plots of the reductant delivery system 151 can be obtained using controls system response measurement techniques commonly known in the art. In certain implementations, the frequency response characteristic plots each include a magnitude plot and a phase plot representing the reductant delivery system response signal versus normalized signal frequency. The magnitude plot can be modeled as a function of the steady state gain offset parameter δ according to 20*log 10(δ). Accordingly, steady state gain offset parameter δ is obtainable with knowledge of the magnitude plot of the system response signal.

The time constant parameters α and β can be obtained from experimentally obtained data concerning the actual dosing delays associated at specific commanded reductant dosing rates. For example, the time constant parameters α and β can be determined from the frequency response characteristic plot of the reductant delivery system 151. More specifically, the time constant parameter α for a given commanded reductant dosing rate is equal to the inverse of the higher corner frequency of the normalized reductant dosing frequency response magnitude plot at the given commanded reductant dosing rate. Similarly, the time constant parameter β for a given commanded reductant dosing rate is equal to the inverse of the lower corner frequency of the normalized reductant dosing frequency response magnitude plot at the given commanded reductant dosing rate. Stored data regarding pre-obtained normalized reductant dosing frequency response characteristic plots for possible commanded reductant dosing rates can be accessible by the reductant doser plant module 320 and used to determine the predicted actual reductant dosing rate 220.

Figure 7:
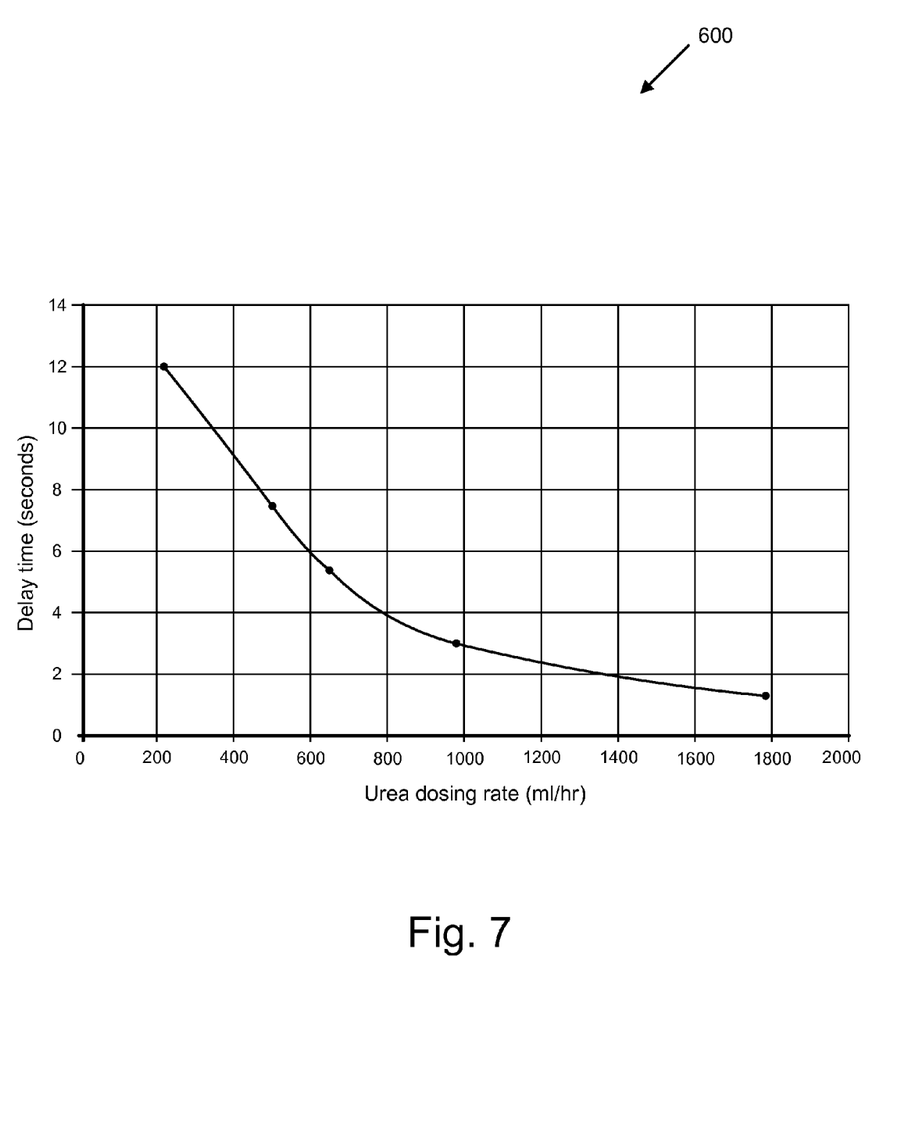
FIG. 7 is a graph illustrating a functional relationship between commanded reductant dosing rate and a time delay between the reductant dosing rate command and the actual reductant injection for a representative doser.

FIG. 7 shows a function relationship 600 of measured reductant dosing delays to reductant dosing rates based on empirical evidence from a representative doser of a representative engine system. As shown, the reductant dosing delay increases as the commanded reductant dosing rate decreases, and the reductant dosing delay decreases as the commanded reductant dosing rate increases. Accordingly, the time constant parameters α and β each increase in correspondence to a decrease in the commanded urea dosing rate, and decrease in correspondence to an increase in the commanded urea dosing rate. Moreover, FIG. 7 shows that for the representative system tested, the reductant dosing delay fluctuates more dramatically at lower reductant dosing rates than at higher reductant dosing rates.

The test data shown in FIGS. 6 and 7 can be stored in a memory accessible by the controller 130, such as in the form of a look-up table, and accessed by the reductant doser plant module 320 to determine the actual reductant dosing rate 220. Similarly, the pure delay $T_d$ of the system can be stored on a memory accessible by the natural delay module 300 to determine the natural delay compensated reductant dosing rate 310. It is recognized that functional relationships shown in FIGS. 6 and 7 can be experimentally obtained and stored for any of various doser and engine system configurations.

Figure 5:
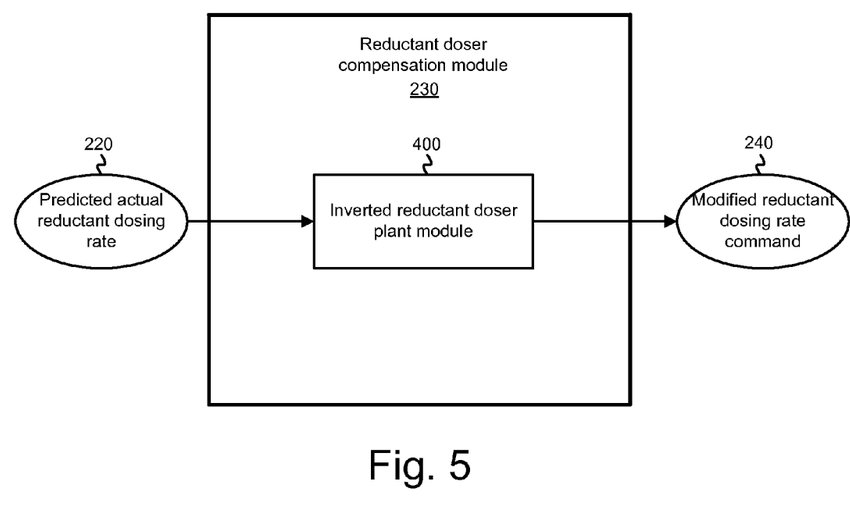
FIG. 5 is a schematic diagram of a reductant doser compensation module of the controller of FIG. 3 according to one representative embodiment.

Referring to FIG. 5, the reductant doser compensation module 230 receives the predicted actual reductant dosing rate 220 from the actual reductant dosing rate module 170 and modifies it to obtain a modified reductant dosing rate, which is represented by the modified reductant dosing rate command 240. The predicted actual reductant dosing rate 220 is modified by an inverted reductant doser plant module 400 through application of an inverse reductant doser plant model G(s) defined by the following equation:

$$G(s) = \frac{1}{P(s)} = \frac{\beta s + 1}{\alpha s + \delta} \quad (3)$$

where s, δ, α, and β represent parameters as described above in relation Equation 2. The reductant doser compensation module 230 calculates the modified reductant dosing rate by multiplying the actual reductant dosing rate 220 by the inverse reductant doser plant model G(s) value. The parameters δ, α, and β of Equation 3 can be experimentally obtained and stored in the same manner as described above. In certain implementations, the parameters δ, α, and β of Equation 3 are determined from the same stored look-up table as described above in relation to Equation 2.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

Figure 8:
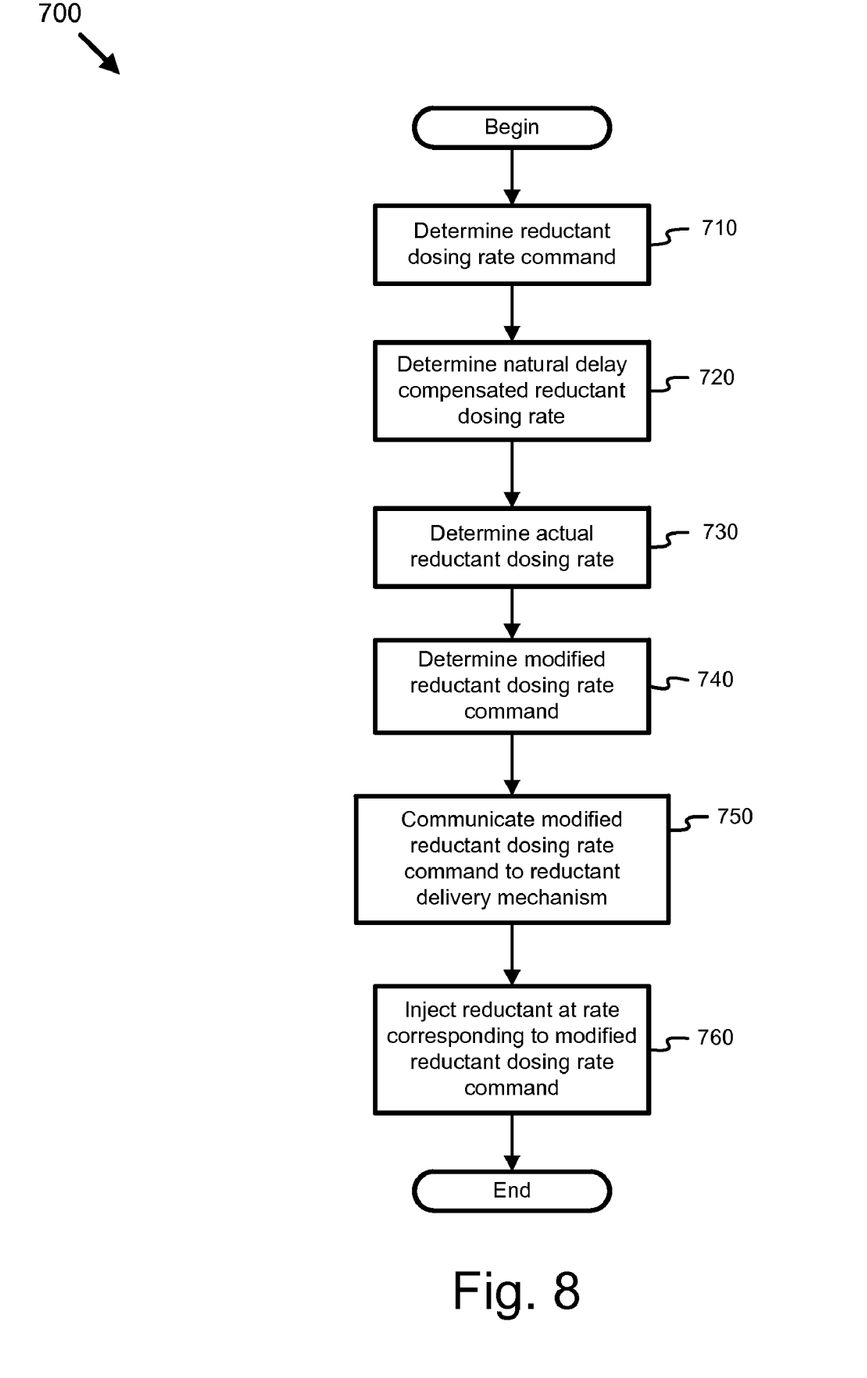
FIG. 8 is a schematic flow chart diagram representing one embodiment of a method for controlling reductant dosing in an SCR catalyst system.

According to one exemplary method 700 for controlling reductant dosing in an SCR catalyst system shown in FIG. 8, the engine system controller 130 determines 710 the reductant dosing rate command 202 representing the desired reductant dosing rate. The reductant dosing rate command is received by the actual reductant dosing rate module 170. The natural delay module 300 of the actual reductant dosing rate module 170 determines 720 the natural delay compensated reductant dosing rate 310 through application of Equation 1 above, such as by multiplying the commanded reductant dosing rate by Equation 1. Calculating the value of Equation 1 can include obtaining the pure delay $T_d$ of the system from a memory located on or accessible by the controller 130. Based at least partially on the natural delay compensated reductant dosing rate 310, the reductant doser plant module 320 determines 730 the actual reductant dosing rate 220 through application of Equation 2 above, such as by multiplying the natural delay compensated reductant dosing rate 310 by the value obtained from Equation 2. Calculating the value of Equation 2 can include accessing the system parameters δ, α, and β from a memory located on or accessible by the controller 130.

Based at least partially on the actual reductant dosing rate 220, the inverted reductant doser plant module 400 of the reductant doser compensation module 230 determines 740 the modified reductant rate commanded by the modified reductant dosing rate command 240 through application of Equation 3 above, such as by multiplying the actual reductant dosing rate by the value obtained from Equation 3. Calculating the value of Equation 3 can include accessing the system parameters δ, α, and β from a memory located on or accessible by the controller 130.

The modified reductant dosing rate command 240 representing the modified reductant dosing rate is communicated 750 to the reductant delivery mechanism 190 of the SCR system 150. The reductant delivery mechanism 190 then injects 760 reductant into the exhaust stream through the injector 192 at a rate corresponding to the modified reductant dosing rate command 240.

The present invention may be embodied in other specific forms without departing from its spirit or essential characteristics. For example, various specific embodiments of the disclosed apparatus, system, and method are described in the several appended claims below. The embodiments described above and in the following claims are to be considered in all respects only as illustrative and not restrictive.

Several specific embodiments of the apparatus, system, and method of the present disclosure are defined according to the following appended claims:

The invention claimed is:

1. An apparatus for controlling reductant dosing in an SCR catalyst system having a reductant injection system configured to inject reductant into an exhaust gas stream, the apparatus comprising:
a controller configured to determine a reductant dosing rate command representing a desired reductant dosing rate;
an actual reductant dosing rate module configured to determine a predicted actual reductant dosing rate based at least partially on the reductant dosing rate command; and
a reductant doser compensation module configured to determine a modified reductant dosing rate command based at least partially on the predicted actual reductant dosing rate;
wherein the reductant injection system injects reductant into the exhaust gas stream at a rate corresponding to the modified reductant dosing rate command.

2. The apparatus of claim 1, wherein the actual reductant dosing rate module comprises a natural delay module configured to determine a natural delay compensated reductant dosing rate.

3. The apparatus of claim 2, wherein the natural delay compensated reductant dosing rate is determined by multiplying the desired reductant dosing rate by $e^{-sT_d}$, where s is a Laplace transform complex variable and $T_d$ is the pure delay of the SCR catalyst system.

4. The apparatus of claim 2, wherein the actual reductant dosing rate module comprises a reductant doser plant module configured to determine the predicted actual reductant dosing rate based at least partially on the natural delay compensated reductant dosing rate.

5. The apparatus of claim 4, wherein the predicted actual reductant dosing rate is determined by multiplying the natural delay compensated reductant dosing rate by $$\frac{\alpha s + \delta}{\beta s + 1},$$

wherein s is a Laplace transform complex variable, δ is a steady state gain offset parameter, α is a first time constant parameter, and β is a second time constant parameter.

6. The apparatus of claim 5, further comprising at least one look-up table accessible by the reductant doser plant module, wherein the at least one look-up table comprises experimentally obtained data sets from which the steady state gain offset parameter δ, the first time constant parameter α, and the second time constant parameter β are obtained.

7. The apparatus of claim 1, wherein the reductant doser compensation module comprises an inverted reductant doser plant module configured to determine the modified reductant dosing rate command by multiplying the predicted actual reductant dosing rate by $$\frac{\beta s + 1}{\alpha s + \delta},$$

wherein s is a Laplace transform complex variable, δ is a steady state gain offset parameter, α is a first time constant parameter, and β is a second time constant parameter.

8. The apparatus of claim 7, further comprising at least one look-up table accessible by the inverted reductant doser plant module, wherein the at least one look-up table comprises experimentally obtained data sets from which the steady state gain offset parameter δ, the first time constant parameter α, and the second time constant parameter β are obtained.

9. The apparatus of claim 1, wherein the modified reductant dosing rate command compensates for (i) discrepancies between the reductant dosing rate command and the actual reductant dosing rate of the reductant injected into the exhaust gas stream; and (ii) any physical delays of the reductant injection system.

10. A method for controlling reductant dosing in an SCR catalyst system having a reductant injector configured to inject reductant into an exhaust gas stream, the method comprising:
determining a reductant dosing rate command representing a desired reductant dosing rate;
determining a predicted actual reductant dosing rate corresponding to the reductant dosing rate command;
determining a modified reductant dosing rate command based at least partially on the predicted actual reductant dosing rate; and
injecting reductant into the exhaust gas stream at a rate corresponding to the modified reductant dosing rate command.

11. The method of claim 10, further comprising modifying the reductant dosing rate command to compensate for a natural delay of the SCR catalyst system.

12. The method of claim 11, wherein the predicted actual reductant dosing rate is based at least partially on the natural delay of the SCR catalyst system.

13. The method of claim 10, wherein the modified reductant dosing rate command is based at least partially on the difference between a predetermined actual reductant dosing rate resulting from the reductant dosing rate command and the desired reductant dosing rate.

14. The method of claim 10, wherein the modified reductant dosing rate command is based at least partially on a predetermined time constant between the reductant dosing rate command and an injection of reductant corresponding to the reductant dosing rate command.

15. The method of claim 10, wherein the modified reductant dosing rate command is based at least partially on a first predetermined time constant and second predetermined time constant, wherein the first predetermined time constant corresponds to a higher corner frequency of an actuation system response characteristic plot and the second predetermined time constant corresponds to a lower corner frequency of the actuation system response characteristic plot.

16. The method of claim 10, wherein the modified reductant dosing rate command is a function of $$\frac{\beta s + 1}{\alpha s + \delta},$$

wherein s is a Laplace transform complex variable, δ is a predetermined steady state gain offset between the reductant dosing rate command and an actual injection rate of reductant corresponding to the reductant dosing rate command, α is a first predetermined time constant based at least partially on the time delay between the reductant dosing rate command and the actual injection of reductant corresponding to the reductant dosing rate command, and β is a second predetermined time constant based at least partially on the time delay between the reductant dosing rate command and the actual injection of reductant corresponding to the reductant dosing rate command.

17. A system for controlling reductant dosing in an SCR catalyst system of an engine system, the system comprising:
a selective catalytic reduction (SCR) catalyst that reduces $NO_x$ emissions in an exhaust gas stream in the presence of a reductant;
a reductant injection system that injects reductant into the exhaust gas stream upstream of the SCR catalyst;
a controller configured to command the reductant injection system to inject reductant into the exhaust gas stream at a commanded reductant dosing rate, the controller comprising:
a reductant dosing rate command module configured to determine a reductant dosing rate command corresponding to a desired reductant dosing rate;
an actual reductant dosing rate module configured to determine a predicted actual reductant dosing rate corresponding to the reductant dosing rate command, the predicted actual reductant dosing rate being a function of the natural delay of the reductant injection system; and
a reductant doser compensation module configured to determine a modified reductant dosing rate command representing a modified reductant dosing rate, the modified reductant dosing rate being a function of an accuracy and a time delay of the injection system, the accuracy comprising the difference between a predicted actual reductant dosing rate resulting from the reductant dosing rate command and the desired reductant dosing rate, and the time delay comprising a predicted time constant between the reductant dosing rate command to inject reductant into the exhaust gas stream at the desired dosing rate and the actual injection of the reductant;
wherein the reductant injection system is configured to inject reductant into the exhaust gas stream at the modified reductant dosing rate according to the modified reductant dosing rate command such that the actual reductant dosing rate is substantially equal to desired reductant dosing rate.

18. The system of claim 17, wherein the actual reductant dosing rate module determines the predicted actual dosing rate by multiplying the desired reductant dosing rate by (i) $e^{-sT_d}$, wherein s is a Laplace transform complex variable and $T_d$ is the pure delay of the SCR catalyst system, and (ii)

$$\frac{\alpha s + \delta}{\beta s + 1},$$

wherein s is a Laplace transform complex variable, δ is a steady state gain offset parameter, α is a first time constant parameter, and β is a second time constant parameter.

19. The system of claim 18, wherein the first time constant parameter α comprises the inverse of a higher corner frequency of a normalized reductant dosing frequency response characteristic at the commanded reductant dosing rate, and the second time constant parameter β comprises the inverse of a lower corner frequency of the normalized reductant dosing frequency response characteristic at the commanded reductant dosing rate.

20. The system of claim 18, wherein the reductant doser compensation module determines the modified reductant dosing rate associated with the modified reductant dosing rate command by multiplying the predicted actual dosing rate by $$\frac{\beta s + 1}{\alpha s + \delta},$$

wherein s is a Laplace transform complex variable, δ is a steady state gain offset parameter, α is a first time constant parameter, and β is a second time constant parameter.

21. The system of claim 17, wherein:
the higher the desired reductant dosing rate, the greater the impact of the accuracy of the injection system on the modified reductant dosing rate command and the lesser the impact of the time delay of the injection system on the modified reductant dosing rate command; and
the lower the desired reductant dosing rate, the lesser the impact of accuracy of the injection system on the modified reductant dosing rate command and the greater the impact of the time delay of the injection system on the modified reductant dosing rate command.

* * * * *